Aug. 23, 1949.  R. C. MORRIS  2,479,763
MOTORCYCLE SUPPORT
Filed July 13, 1946
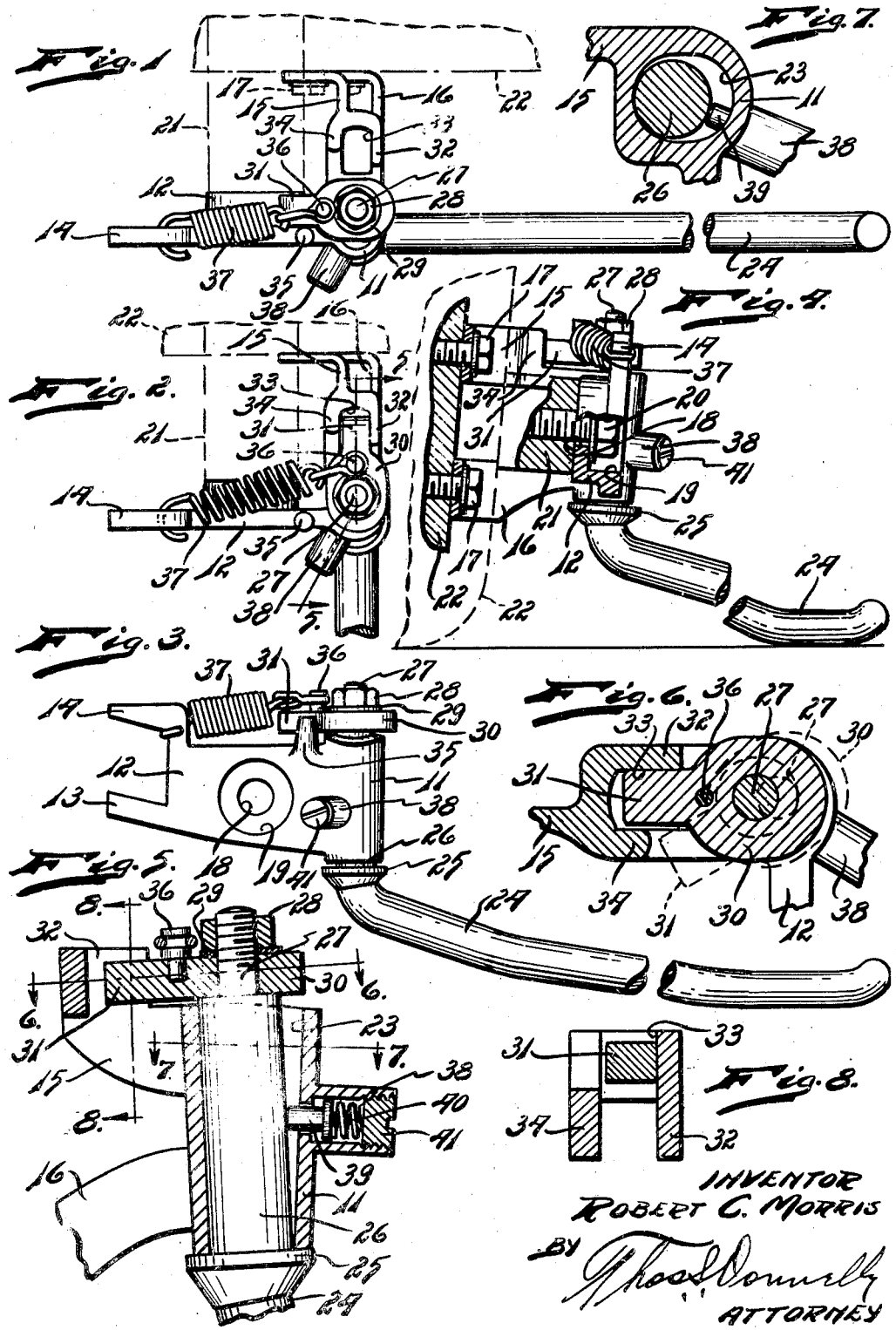

Patented Aug. 23, 1949

2,479,763

UNITED STATES PATENT OFFICE 2,479,763

MOTORCYCLE SUPPORT

Robert C. Morris, Detroit, Mich.

Application July 13, 1946, Serial No. 683,395

5 Claims. (Cl. 280—301)

My invention relates to a new and useful improvement in a motor cycle support adapted for mounting on a motor cycle and so arranged and constructed that a supporting brace may be extended outwardly to engage the ground on which the motor cycle rests and prevent the motor cycle from falling over when not in use and so arranged and constructed that the supporting brace or leg may be easily and quickly swung into inoperative position so as to clear the ground or surface upon which the motor cycle is driven.

It is an object of the invention to provide a structure so arranged so that the bracing or supporting leg may be easily and quickly locked in operative position while permitting easy release of the same for movement to inoperative position.

Another object of the invention is the provision of a supporting leg having an angularly turned portion to provide an axis on which the leg may swing and projected through a bearing in such a manner that the leg will automatically, when moved to operative position, be locked or secured in operative position.

Another object of the invention is the provision of a support of this class of a supporting leg having an angularly turned portion about which the leg may swing and projected through a bore of larger diameter than the angularly turned portion and provided with securing means which will, upon tilting of the angularly turned portion in one direction, effect a securing of the supporting leg in operative position.

Another object of the invention is the provision of a device of this class which will be simple in structure, economical to manufacture, durable, compact, and highly efficient in use.

Other objects will appear hereinafter.

It is recognized that various modifications and changes may be made in the detail of structure illustrated without departing from the invention itself and it is intended that such shall be embraced within the scope of the claims which form a part hereof.

Forming a part of this specification are drawings in which,

Fig. 1 is a top plan view of the invention showing the supporting leg in inoperative position, Fig. 2 is a top plan view of the invention showing the supporting leg moved to operative position and with a part broken away, Fig. 3 is a side elevational view of the invention showing the supporting leg with a part broken away and in inoperative position, Fig. 4 is a side elevational view illustrating the mounting of the invention with parts broken away and parts shown in section.

Fig. 5 is an enlarged fragmentary sectional view taken on line 5—5 of Fig. 2,

Fig. 6 is a fragmentary sectional view taken on line 6—6 of Fig. 5,

Fig. 7 is a sectional view taken on line 7—7 of Fig. 5,

Fig. 8 is a sectional view taken on line 8—8 of Fig. 5.

In the drawings I have indicated a supporting bracket or hub 11, projecting outwardly from which is a supporting plate 12 having a pair of tongues 13 and 14 formed on the outer edge. Projecting outwardly from the hub 11 at substantially right angles to the direction of the extension of the plate 12, are supporting brackets 15 and 16 each of which has an angularly turned end secured by means of the bolt 17 to the supporting portion 22 of the motor cycle with which used.

Formed through the plate 12 is an opening 18 having the counter-bore 19 formed on one face thereof. Engaging in this counter-bore 19 is the head of a bolt 20 which is threaded into the stud 21 which projects outwardly from the portion 22 of the motor cycle on which the structure is mounted so that the plate 12 thus cooperates with the brackets 15 and 16 in securing the device in position on the motor cycle with which used.

Supporting leg 24 is provided with the enlarged shoulder 25 at the end of the angularly turned portion 26. This angularly turned portion 26 projects through a bore 23 in the hub 11. As clearly shown in Fig. 5, this bore is conical in formation being larger at its upper end than it is at its lower so that the angularly turned portion may tilt while positioned within the bore 23. Formed on this angularly turned portion 26 is the threaded extension 27 on which is threaded a nut 28 bearing against the gasket 29 which seats against the plate 30. Projecting outwardly from this plate 30 is the tongue 31 which is adapted to swing into alignment with the channel 33 formed between the portions 32 and 34 which are part of the bracket 15. When the angularly turned portion 26 is tilted to substantially vertical position the tongue 31 will clear the portion 34 and then when tilted into the position shown in Fig. 5, the tongue 31 will engage in the channel 33. The plate 30 is so secured, by means of the nut 28, that it is in fixed relation to the angularly turned portion 26 and rotates in unison therewith. Projecting upwardly from the plate 12 is a stud 35. Projecting upwardly from the plate 30 is a stud 36 to which one end of the spring 37 is attached, the other end being attached to the tongue 14 as clearly shown in Fig. 3. The construction is such that the spring 37 normally tends to rotate the angularly turned portion 26 to swing the leg 24 into inoperative position.

Mounted on and projecting outwardly from the hub 11, is a housing 38 positioned in which is a plunger 39 projected through an opening formed in the hub 11 and having a head against which one end of the coil spring bears, the other end of the coil spring 40 bearing against the plug 41 which is threaded into the end of the housing 38. The construction is such that the plunger 39, moving in response to the compression of the spring 40, serves to tilt the portion 26 into the position so that the tongue 31 will engage in the channel 33.

The construction is such that when the portion 26 is tilted into the position shown in Fig. 5, the supporting leg 24 will be contacting the ground or surface on which the motor cycle rests and cannot be swung to lie parallel to the side of the motor cycle. The portion 26 will be retained in the position shown in Fig. 5, by virtue of the member 31 lying in the channel 33. When the operator desires to use the supporting leg 24 to support the motor cycle, which will be in a slightly inclined position toward the side on which the invention is mounted, the leg 24 would be manually swung outwardly from the parallel position to extend at right angles to the body of the motor cycle. In this movement, of course, the spring 37 will be stretched and when the tongue 31 registers with the channel 33 the plunger 39 will serve to press the portion 26 toward the position shown in Fig. 5, until the tongue 31 engages in the channel 33. When the weight of the motor cycle is placed upon the supporting leg 24 the portion 26 will be tilted further into exactly the position shown in Fig. 5, with the tongue 31 engaging deeper in the channel 33. When it is desired to use the motor cycle, the motor cycle will be raised from its inclined position to vertical position and downward pressure exerted on the leg 24. This would tend to tilt the portion 26 until the tongue 31 would disengage from the channel 33 whereupon the spring 37 will swing the supporting leg to inoperative position as shown in Fig. 1.

It will be noted that the device is secured in inoperative position by means of the spring 37 and that it is also secured in operative position because of the engagement of the tongue 31 in the channel 33.

Experience has shown that the device is one which may be easily and quickly operated and one which is most efficient in use.

What I claim as new is:

1. A supporting structure of the class described, comprising: a bracket adapted for mounting on the structure to be supported; a hub carried by said bracket and having a vertically directed bore formed therethrough of larger diameter at its upper end than its lower end; a supporting leg; an angularly turned portion on said supporting leg and projected through said bore and adapted for tilting and rotative movement in said bore; a channel forming portion on said bracket; a tongue projecting outwardly from the end of said angularly turned portion and carried thereby in fixed relation thereto and adapted, upon rotation of said leg into operative position, for moving into alignment with the channel in said channel bearing portion and upon tilting of said angularly turned portion in one direction for engaging in the channel of said channel forming portion for preventing rotation of said angularly turned portion relatively to said bore.

2. A supporting structure of the class described, comprising: a bracket adapted for mounting on the structure to be supported; a hub carried by said bracket and having a vertically directed bore formed therethrough of larger diameter at its upper end than its lower end; a supporting leg; an angularly turned portion on said supporting leg and projected through said bore and adapted for tilting and rotative movement in said bore; a channel forming portion on said bracket; a tongue projecting outwardly from the end of said angularly turned portion and carried thereby in fixed relation thereto and adapted, upon rotation of said leg into operative position, for moving into alignment with the channel in said channel bearing portion and upon tilting of said angularly turned portion in one direction for engaging in the channel of said channel forming portion for preventing rotation of said angularly turned portion relatively to said bore the position of said channel in said channel bearing portion being such that upon movement of said supporting leg to operative position and placing weight thereon, said angularly turned portion will be tilted for moving said tongue into the channel of said channel bearing portion.

3. In a supporting structure of the class described, a bracket adapted for mounting on the structure to be supported; a hub carried by said bracket and having a vertically directed bore formed therethrough formed larger at its upper end than at its lower end; a supporting leg; angularly turned portion on one end of said leg and projected through said bore and adapted for rotative and tilting movement relatively to said bore, said leg being swingable to operative position and projecting outwardly from said bore and swingable to inoperative position for extending substantially parallel to the structure supported; an outwardly projecting tongue carried by said angularly turned portion above the end of said bore and in fixed relation to said angularly turned portion; and a channel carried by said bracket and adapted for reception of said tongue upon swinging of said leg to operative position and the tilting of said angularly turned portion, for resisting swingable movement of said leg.

4. In a supporting structure of the class described, a bracket adapted for mounting on the structure to be supported; a hub carried by said bracket and having a vertically directed bore formed therethrough formed larger at its upper end than at its lower end; a supporting leg; angularly turned portion on one end of said leg and projected through said bore and adapted for rotative and tilting movement relatively to said bore, said leg being swingable to operative position and projecting outwardly from said bore and swingable to inoperative position for extending substantially parallel to the structure supported; an outwardly projecting tongue carried by said angularly turned portion above the end of said bore and in fixed relation to said angularly turned portion; and a channel carried by said bracket and adapted for reception of said tongue upon swinging of said leg to operative position and the tilting of said angularly turned portion, for resisting swingable movement of said leg; and resilient means operating upon the angularly turned portion for tilting the same, upon the swinging of said leg to operative position, for moving said tongue into said channel.

5. A supporting structure of the class described, comprising: a bracket adapted for mounting on the structure to be supported; a hub carried by said bracket and having a bore formed therethrough extended vertically and having its upper end of larger diameter than its lower end; a supporting leg; an angularly turned portion on said leg projecting through said bore and beyond the upper end thereof, said leg being swingable on said angularly turned portion as an axis to operative and inoperative position, and said angularly turned portion being tiltable in said bore; a channel carried by said bracket; a tongue carried by said end of and projecting radially outwardly from said angularly turned portion and rotatable in unison therewith, the position of said bracket being such that upon swinging of said leg to operative position, said tongue will be in alignment with said channel, said tongue being adapted for entering said channel and preventing swinging of said leg; and spring means for assisting in moving said tongue into said channel upon registration therewith.

ROBERT C. MORRIS.

REFERENCES CITED

The following references are of record in the file of this patent:

UNITED STATES PATENTS

| Number | Name | Date |
| --- | --- | --- |
| 2,201,922 | Rylander | May 21, 1940 |

FOREIGN PATENTS

| Number | Country | Date |
| --- | --- | --- |
| 21,369 | Great Britain | Sept. 26, 1896 |